C. BORNMANN & E. C. CLARK.
PHOTOGRAPHIC SHUTTER.
APPLICATION FILED NOV. 11, 1915.
1,185,283.
Patented May 30, 1916.
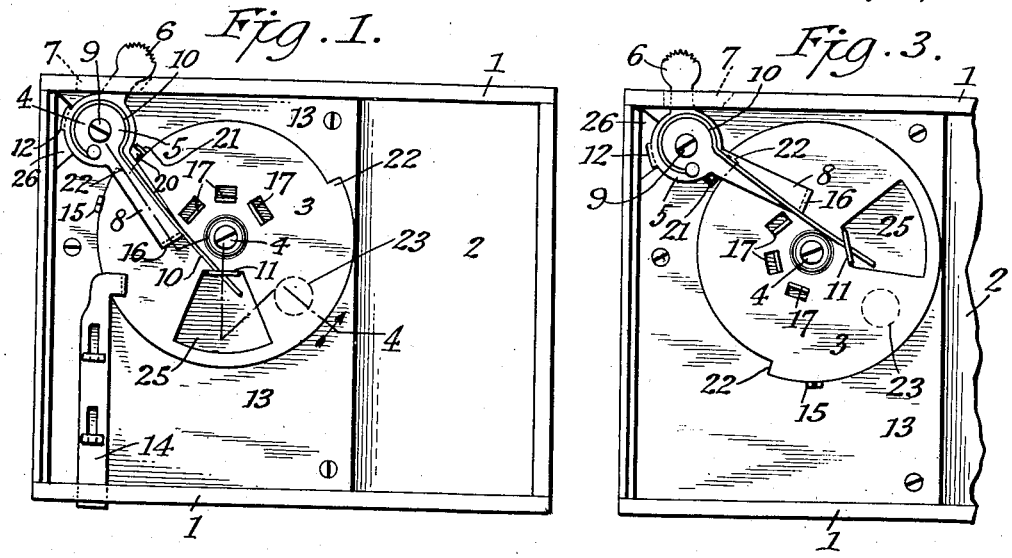
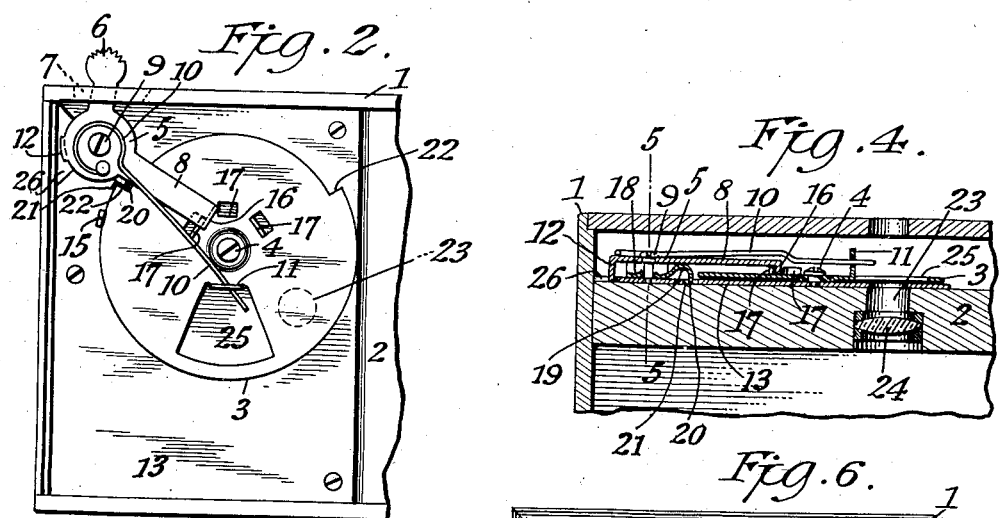
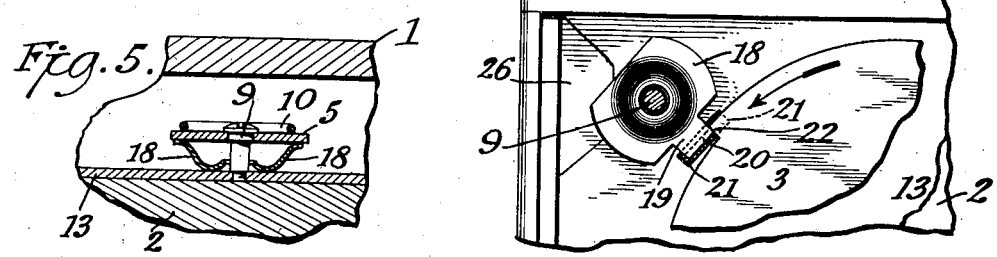
Inventors
Carl Bornmann
Ezra C. Clark
By their Attorney
Phillips Abbott.

UNITED STATES PATENT OFFICE.

CARL BORNMANN AND EZRA C. CLARK, OF BINGHAMTON, NEW YORK, ASSIGNORS TO ANSCO COMPANY, OF BINGHAMTON, NEW YORK, A CORPORATION OF NEW YORK.

PHOTOGRAPHIC SHUTTER.

1,185,283.      Specification of Letters Patent.      Patented May 30, 1916.

Application filed November 11, 1915. Serial No. 60,825.

*To all whom it may concern:*

Be it known that we, CARL BORNMANN and EZRA C. CLARK, both citizens of the United States, and both residents of the city of Binghamton, county of Broome, and State of New York, have invented certain new and useful Improvements in Photographic Shutters, of which the following is a specification.

The invention relates to so-called two-way shutters, in which a perforated oscillating shutter plate makes an exposure at each movement, and it particularly relates first, to certain improvements in the construction and method of operation of the shutter lever, so-called, to which the actuating spring is attached; second, to improvements in the devices whereby the shutter is held against the stress of the spring until the latter has attained the requisite tension; third, to the employment of a frictional cushioning device with which the shutter engages when near the end of its movements and by which rebound on the part of the shutter is prevented.

The invention includes in addition to the foregoing, various details of construction hereinafter set forth, whereby economy and convenience are secured.

In the drawings, Figure 1 is a plan view of the mechanism, the shutter being shown in the position it occupies after having made an exposure by a movement to the left; Fig. 2 is a plan view similar to Fig. 1, showing the position of the parts while the shutter lever is being moved and tension applied to the spring adapted to move the shutter to the right; Fig. 3 is a plan view similar to Fig. 1, showing the position of the parts, the shutter having completed its movement to the right and made an exposure; Fig. 4 is a vertical sectional view of the apparatus through the line 4—4 of Fig. 1; Fig. 5 is a vertical sectional view through the line 5—5 of Fig. 4, showing details of construction; Fig. 6 is a plan view of the friction device and portion of the shutter.

1 represents an ordinary box camera, 2 the front board thereof, which, in this instance, supports the base plate of the shutter mechanism, 3 the shutter, which is pivoted as usual at 4.

5 is the shutter lever provided with an arm 6 which projects through an opening 7 made in the camera (see Fig. 3). Its outer surface is preferably knurled or roughened for easy manipulation. 8 is another arm which projects toward the center of the shutter. This shutter lever is pivoted at 9 and is provided with the shutter actuating spring 10. It engages with an upwardly turned lip 11 upon the shutter, preferably by passing through a slot made in it. The shutter lever also has a stud 12 which may beneficially be formed thereon during the time the lever is stamped. The stud is bent at right angles to the plane of the shutter lever, as seen best in Fig. 4.

13 is a base plate, preferably made of metal and secured to the front board 2 as shown.

14 is the time stop lever. It may be of any preferred form. It engages at appropriate times, depending upon its position, with a stud or projection 15, in a manner well understood. At the end of the arm 8 of the actuating lever is a downwardly turned flange 16, which engages with upwardly turned flanges 17 formed on the face of the shutter preferably by cutting them therefrom during the stamping of the shutter plate.

18 (see best Fig. 6) is a frictional cushioning device. It is made somewhat in the form of the ordinary concavo-convex or dish shaped spring, the edges whereof are resilient and are higher than the center and from one side projects a curved lip 19 (see Fig. 4) having a downwardly turned flange or terminal 20 at its outer extremity which passes through an elongated slot 21 made in the base plate, and the relation of the parts is such that the downwardly turned flange lies in the path of a pair of oppositely presented shoulders 22 made on the periphery of the shutter, so that at the end of each movement of the shutter, one or the other of these shoulders 22 will come in contact with the flange 20 of this friction device.

23 is the exposure opening in the front board of the camera, 24 is the lens, 25 is the exposure opening in the shutter.

The operation is as follows: Referring to Fig. 1, let it be assumed that the parts are in the position they occupy just after an exposure has been made by an oscillation or swinging movement of the shutter to the left. Now to effect a movement or oscillation of the shutter in the opposite direction, or to the right, the operator presses his finger upon the knurled head of the lever arm 6 which projects beyond the side of the camera or shutter casing, as the case may be, and gently presses it to the left, as illustrated in Fig. 2. In so doing tension is of course applied to the spring 10 and the shutter would move in response thereto were it not that the inner surface of the rectangular flange 16 on the extremity of the arm 8 of the shutter lever engages with the left-hand stop 17 on the shutter, whereby the latter is prevented from responding to the stress of the spring during the relatively slight strain thereon at the commencement of the application of tension thereto, and by the time the tension has become at all pronounced, the flange 16 on the arm 8 has passed beyond the left hand end of the central stop 17, so that it will engage with the outer surface of the flange 16 and hold the shutter against the increased tension of the spring until finally when the flange 16 has passed beyond the left hand end of the central stop 17, then control of the shutter will have been lost and the spring will instantly under its considerable tension effect the desired movement to the right, the parts assuming the position shown in Fig. 3, and as the shutter has nearly completed this movement, the uppermost shoulder 22, as shown in Fig. 3, comes in contact with the downwardly extending flange 20 of the frictional cushioning device 18, which as stated before, rests in and is adapted to movement through the elongated slot 21 made in the base plate. It will be noted that this frictional device is held solely by the friction imposed upon it by the pivot or screw 9 of the shutter lever (see Fig. 5) and the tension applied is such that the blow delivered by the shoulder 22 of the shutter will be sufficient to overcome the friction between the cushioning device and the surfaces with which it engages, so that it will be set over to or at least toward the opposite end of the slot 21 in the base plate, thus taking up or neutralizing any rebounding tendency on the part of the shutter, and it will be further noted that the flange 20 on the frictional device will remain after this movement of the shutter at the left hand end of the slot 21 in the base plate ready to receive a similar blow and afford a similar cushioning action when the other shoulder 22 on the shutter shall come in contact with it in the opposite direction on the next movement of the shutter. During the succeeding movement to the left, the shutter will be held against responding to the tension of the spring 10 by engagement with the right hand stop 17 (see Fig. 2) during the primary application of tension to the spring and subsequently by the right hand end of the central stop 17 in the same manner as above explained relative to the left hand stop 17 and the left hand end of the central stop 17.

In order that all strains may be removed from the shutter and spring mechanism and that a positive limit of movement may be provided for the shutter lever, thus avoiding the possibility of disorganization by reason of too rough handling and also to secure and maintain the proper relation of the parts, we provide the lever with the stop 12 which may be formed on the lever during the time of its stamping and bent at right angles thereto. The stop 12 operates in a recess 26 cut in the base plate 13 in such manner that it will strike against the metal of the base plate which defines the end of the recess, as shown best in Figs. 1 and 3, thus affording a positive stop to the movement of the lever arm.

It will be obvious to those who are familiar with such matters that the invention is applicable to cameras of many different constructions and that if the camera be a folding one, or one which does not have a front board or a base plate, that equivalent parts may be provided, as, for example, a casing specially prepared for the reception of the shutter mechanism. Indeed, by appropriate modifications, the new features of our invention may be applied to photographic apparatus of various kinds and to cameras of various constructions. We therefore do not limit ourselves in any of these respects.

We claim:

1. The combination of a shutter, a shutter lever, a spring attached at one end to the lever, its free end engaging the shutter, stops on the shutter with which the lever engages and by which the shutter is temporarily held against movement in either direction, and a spring actuated frictional cushioning device located beneath the lever and adapted to engage the shutter.

2. The combination of a shutter, a shutter lever, an actuating spring for the shutter connected to and operated directly by the lever, means upon the lever to hold the shutter against movement until the spring has attained the desired tension and a spring actuated frictional cushioning device adapted to engage the shutter when the shutter is near the end of its movements and located beneath the lever.

3. The combination of a shutter, a shutter lever, an actuating spring for the shutter connected to and operated directly by the lever, means to hold the shutter against movement until the spring has attained the desired tension, a spring actuated frictional cushioning device beneath the lever and means on the shutter adapted to engage the frictional device when near the end of its movements.

4. The combination of a shutter, a shutter lever, an actuating spring for the shutter attached at one end to the lever and at its free end engaging the shutter, means on the lever engaging other means on the shutter to temporarily hold the shutter until the spring has attained the desired tension and a stop on the lever which positively determines its movement.

5. The combination of a shutter, a shutter lever, an actuating spring for the shutter attached at one end to the lever and at its free end engaging the shutter, means on the lever engaging other means on the shutter to temporarily hold the shutter until the spring has attained the desired tension, a stop on the lever which positively determines its movements and a spring actuated frictional cushioning device located beneath the lever and adapted to engage the shutter when the shutter is near the limit of its movements.

6. The combination of a shutter, a shutter lever, a spring attached at one end to the lever, its free end engaging the shutter, a flange on the end of the lever, stops near the center of the shutter with which the said flange engages and by which the shutter is held against movement in either direction until the spring has received its desired tension and stops to limit the movement of the lever.

7. The combination of a shutter, a shutter lever, a spring attached at one end to the lever, a flange on the end of the lever, stops near the center of the shutter with which the said flange engages and by which the shutter is held against movement in either direction until the spring has received its desired tension, and a spring actuated movable cushioning device located beneath the lever adapted to engage the shutter when the latter is near the end of its movements.

8. The combination of a shutter, a shutter lever, a spring attached at one end to the lever, its free end engaging the shutter, a flange on the lever, stops near the center of the shutter with which the said flange engages and by which the shutter is held against movement in either direction until the spring has received its desired tension, a spring actuated cushioning device adapted to engage the shutter when it is near the end of its movements and a stop on the shutter lever whereby the movement of the shutter in either direction is positively determined.

9. The combination of an oscillating shutter, a pivoted shutter lever, an actuating spring for the shutter attached at one end to the lever, its free end engaging the shutter, and three stops on the shutter near its center, the end stops adapted to respectively engage the lever during the movements of the shutter in reverse directions and the central stop adapted to engage the lever during the movement of the shutter in both directions.

10. The combination of an oscillating shutter, a pivoted shutter lever, an actuating spring for the shutter attached at one end to the lever, its free end engaging the shutter, three stops on the shutter near its center, the end stops adapted to respectively engage the lever during the movements of the shutter in reverse directions and the central stop adapted to engage the lever during the movement of the shutter in both directions, and a frictional cushioning device adapted to engage the shutter when the shutter is near the end of its movement in either direction.

In testimony whereof we have signed our names to this specification.

CARL BORNMANN.
EZRA C. CLARK.